Patented Nov. 16, 1943

2,334,262

UNITED STATES PATENT OFFICE 2,334,262

SUBSURFACE PROSPECTING

Donald G. C. Hare, Houston, Tex., assignor to Texaco Development Corporation, New York, N. Y., a corporation of Delaware Application May 29, 1940, Serial No. 337,862

3 Claims. (Cl. 250—83.6)

This invention relates to subsurface prospecting and more particularly to a method and an apparatus to be used in determining the nature of the formations through which a bore hole or well has been drilled. The principal object of the invention is to provide such a method and apparatus which will indicate positively and accurately the presence of hydrocarbon oil sands or formations when the device is passed through these formations and which method can be carried out with a minimum of time and effort.

In drilling a bore hole for a well, it is desirable to know the depth at which are encountered those strata which because of their physical and geological properties may contain oil in quantities of commercial interest. In the past wells have been logged in three general ways. First, by taking continuous core samples or side wall samples. Second, by running an electrical survey or, third, by measuring the natural radioactive background of the formations. The first of these methods is obviously slow and expensive and the data obtained are frequently not reliable. The electrical method has been used in logging uncased holes but is not capable of yielding any pertinent data when used in a hole having the usual metal casing. The third method has not as yet proved to be sufficiently reliable to be commercially feasible.

In accordance with the present invention, a device has been provided for securing a continuous survey of a bore hole and which device is equally suitable for the logging of cased or uncased holes. Since the operation of the device is not influenced by the presence of iron or steel in the hole it may also be adapted to the surveying of holes without necessitating the removal of the drilling tools. In this instance the device could be lowered directly through the drill stem or pipe.

In carrying out the invention, a source of highly energetic or penetrating particles such as fast neutrons is lowered in a suitable casing into the bore hole. Within the casing and separated from the source by means of a suitable shield is a detector adapted to the detection of those particles emitted from the source after they have passed into the formation surrounding the hole and been scattered therein and returned to the detector. The invention also contemplates the provision of a differential detector by means of which the effect of the scattering of the neutrons in the mud or water in the hole will be eliminated or compensated for.

Figure 1:
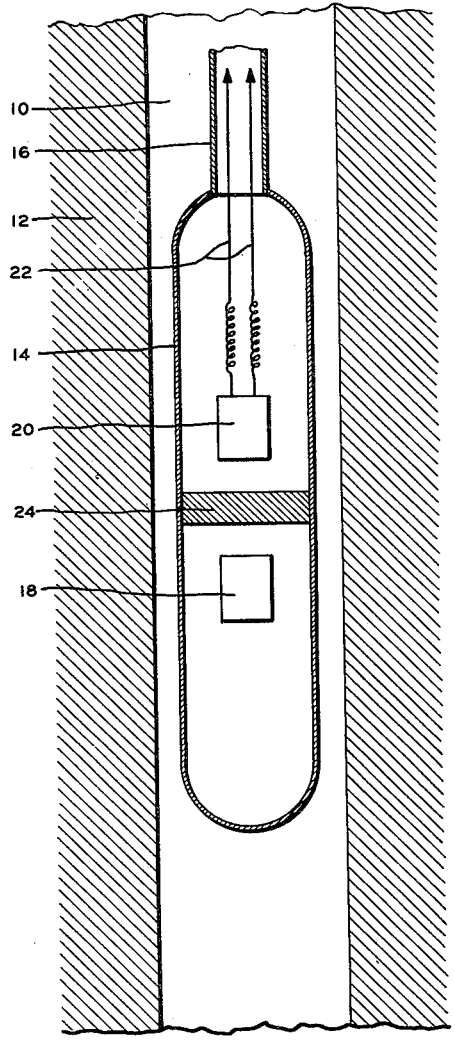
Figure 2:
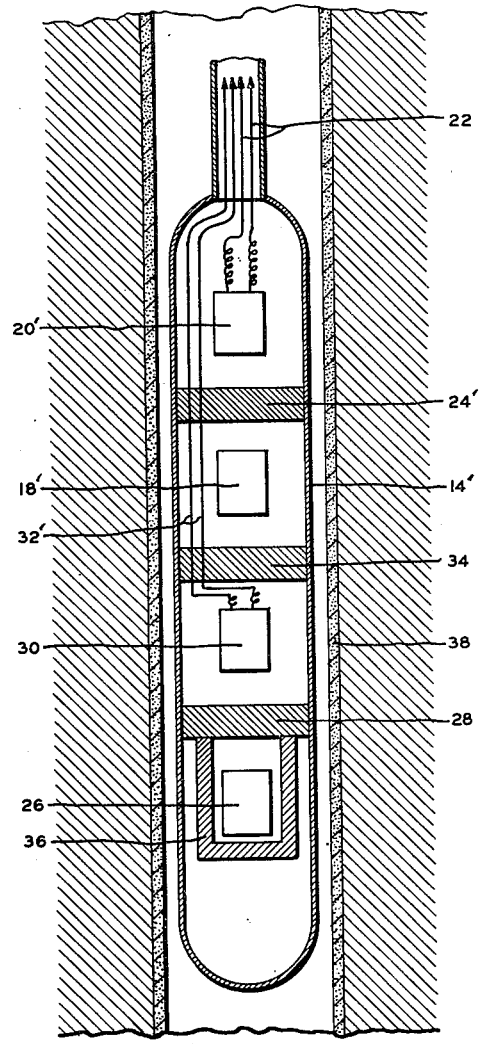

For a better understanding of the invention reference may be had to the accompanying drawing in which Figure 1 is a vertical section through a bore hole showing the logging device adapted to be lowered through the hole and Figure 2 is a view similar to that of Figure 1 but showing a modification in which a differential detector system is utilized.

Referring to the drawing, a hole 10 is shown as having been drilled through the formation 12. A closed casing or housing 14 of any suitable material is adapted to be lowered or raised through the bore hole 10 by means of a string of tubing 16. Instead of the tubing 16 a cable or wire line could also be used for suspending the device within the hole.

Within the lower portion of the casing 14 is a source 18 of highly penetrating particles such as fast neutrons which source may, for instance, be a mixture of radium and beryllium, as is well known in this art. Also disposed within the casing 14 and above the source 18 is a detector 20 suitable for the detecting of particles emitted by the source 18 after they have been slowed down sufficiently. The device 20 may be a slow neutron detector such as a boron trifluoride ionization chamber connected to a linear amplifier by means of the wires 22. This particular type of detector does not form a part of the invention and various other devices may be used for accomplishing the same result. Between the source 18 and the detector 20 is disposed a shield 24, preferably of lead and cadmium for eliminating any unwanted direct radiation from the source to the detector.

The operation of this device will be understood from the following discussion. Neutrons such as those emitted by a radium beryllium mixture have a very high initial velocity and are slowed down or scattered but little in their passage through material consisting primarily of elements of high atomic number. However, in passing through substances containing hydrogen these neutrons are widely scattered and slowed down due to elastic collisions with the hydrogen nuclei. This scattering is largely isotropic in nature and thus if the source and the detector are adjacent a formation made up of substances containing little or no hydrogen, the neutrons emitted from the source 18 will on the average travel a considerable distance into the formation before their direction is sufficiently altered by scattering to cause them to return to the detector 20. Thus, we would expect at the detector a relatively small number of neutrons per second which have been sufficiently slowed down in the scattering process to cause the detector 20 to register their arrival. If now the device is moved to a position adjacent a formation containing a large amount of hydrogen such, for example, as a water or oil sand, the number of slow neutrons registered per second by the detector 20 will greatly increase due to the increased diffusion or scattering and slowing down of the fast neutrons by the hydrogen. This variation in the response of the detector 20 may be observed or recorded by means of any suitable indicator or recorder (not shown) at the surface and connected to the wires 22.

Uncased holes are usually filled with slush or mud which naturally due to its water content contains considerable hydrogen. The presence of this hydrogen will cause the detector to register a rather large but fairly constant background of slow neutrons which have been scattered by the hydrogen in the mud between the instrument and the wall of the bore hole. The effect of this background may be eliminated by proper separation of the source and the detector or by a suitable type of a differential counter arrangement such as is illustrated in Figure 2.

The instrument shown in Figure 2 contains a source 18' of highly penetrating particles and a detector 20' corresponding to the detector 20 of Figure 1 and from which electrical connections 22' lead to the surface. A shield 24' is also arranged between the source 18' and the detector 20' for preventing direct radiation from the source to the detector. In the lower portion of the instrument casing 14' is another source 26 of highly penetrating particles similar to the source 18' and above this and separated from it by a shield 28 is another detector 30 similar to the detector 20' and from which electrical connections 32 lead upwardly to the surface. A third shield 34 is arranged between the source 18' and the detector 30 to prevent direct radiation therebetween. Around the source 26 is placed a block 36 of paraffin or other compound containing a large amount of hydrogen. The thickness of this block or its hydrogen content may be adjusted so that the particles such as the neutrons emitted by the source 26 are sufficiently slowed down that those which are registered by the detector 30 as being scattered outside of the instrument can not have penetrated a distance much greater than the average thickness of the mud 30. The instrument shown in Figure 2 is, like the instrument of Figure 1, lowered through the bore hole and the difference in the relative number of counts registered by the detectors 20' and 30 may then be taken as indicating the presence or absence of hydrogen containing compounds in the strata or formation through which the hole has been drilled.

Obviously many other modifications and variations of the invention as hereinbefore set forth may be made without departing from the spirit and scope thereof, and therefore only such limitations should be imposed as are indicated by the appended claims.

I claim:

1. The method of investigating the formation surrounding a bore hole having a mud sheath on the walls thereof which comprises lowering through said hole simultaneously two sources of highly penetrating particles, one of said sources being surrounded by a material capable of slowing down the particles emitted from the surrounded source so that their penetration will not exceed substantially the thickness of said mud sheath, following each of said sources with a device for detecting particles emitted from said sources and returned to the holes after being scattered in the material surrounding the hole, and observing the difference in the relative number of particles registered by said detecting devices at different depths in the hole as the sources and detecting devices are lowered or raised through the hole.

2. A device for logging the formations surrounding a bore hole at different depths traversed by the hole which comprises a housing, cable means for lowering and raising said housing in the hole, a source of highly penetrating particles in said housing, a detector in said housing for registering the number of particles emitted from said source so as to be scattered in the formation and returned to the detector, a second source of highly penetrating particles in said housing, a second detector in said housing for registering the number of particles emitted from said second source so as to be scattered in the formation and returned to said second detector, and means associated with said second source for slowing down the particles emitted therefrom.

3. A device for logging the formations at different depths traversed by a bore hole which comprises a casing, cable means for lowering and raising said casing in the hole, a source of highly penetrating particles such as fast neutrons in said casing, a detector in said casing for registering the number of particles emitted from said source so as to be scattered in the formation and returned to the detector, a second source of highly penetrating particles such as fast neutrons in said casing, a second detector in said casing for registering the number of particles emitted from said second source so as to be scattered in the formation and returned to said second dectector, means associated with said second source for slowing down the particles emitted therefrom, said means comprising a layer of a hydrogenic substance disposed around said second source, and non-penetrable shields disposed in said casing between said sources and said detectors.

DONALD G. C. HARE.